No. 780,294. PATENTED JAN. 17, 1905.
G. B. KEPLINGER.
PIN LOCK.
APPLICATION FILED FEB. 29, 1904.
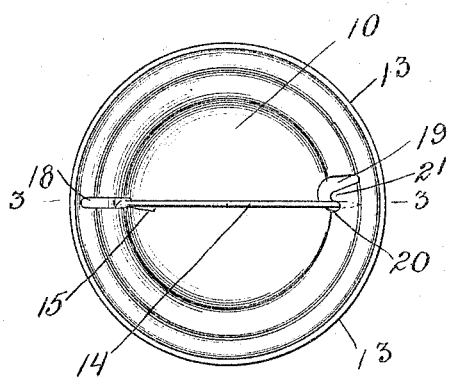
Fig. 1
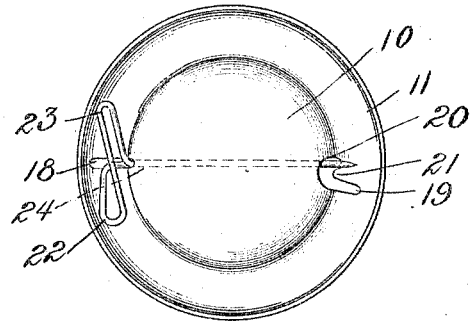
Fig. 5
Fig. 6
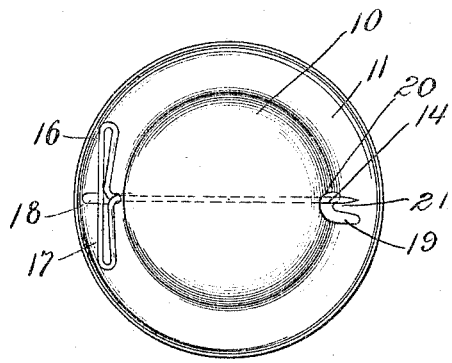
Fig. 2
Fig. 3
Fig. 4
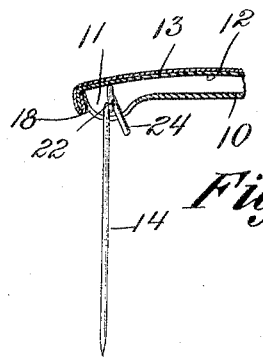
Fig. 7
Witnesses:
Harry R. L. White
Arthur B. Seibold
Inventor:
George B. Keplinger.
By Coburn & McRoberts
Att'ys.

No. 780,294.

Patented January 17, 1905.

UNITED STATES PATENT OFFICE.

GEORGE B. KEPLINGER, OF CHICAGO, ILLINOIS.

PIN-LOCK.

SPECIFICATION forming part of Letters Patent No. 780,294, dated January 17, 1905.

Application filed February 29, 1904. Serial No. 195,731.

*To all whom it may concern:*

Be it known that I, GEORGE B. KEPLINGER, a citizen of the United States, residing at Chicago, in the county of Cook and State of Illinois, have invented certain new and useful Improvements in Pin-Locks, of which the following is a specification.

This invention relates to improvements in pin-locks for brooches, badges, buttons, and similar articles. A serious objection to devices of this character as heretofore made is that the pin soon wears loose, so as to sag down at the free end, and thereby loses its resiliency and does not securely hold the button or other article in place.

The object of the present invention is to overcome this objection.

The improvement resides particularly in the clasp-pin and the manner of constructing and mounting the same; and it consists, essentially, in a spring-pin so arranged and made as to securely maintain the article to which it is attached or of which it is a part in position and which is securely held against lateral movement in its pivot or hinge both when clasped or unclasped.

The invention consists in the parts as hereinafter particularly described and claimed, and is illustrated in the accompanying drawings, in which—

Figure 1 is a bottom view of a suitable article—such as a button, brooch, &c.—showing my improved pin-lock applied thereto, the pin being clasped. Fig. 2 is a top view of the back-plate alone, as shown in Fig. 1, to which the pin is attached. Fig. 3 is a diametrical section on the line 3 3 of Fig. 1. Fig. 4 is a detail side elevation of the pin. Fig. 5 is a view similar to Fig. 2, but showing a modified form of pin. Fig. 6 is a detail side elevation of the pin illustrated in Fig. 5, and Fig. 7 is a diametrical section through the hinge side of the button and showing the pin unclasped.

I have illustrated the invention in connection with a button; but it is to be understood that it is capable of use with any article requiring a clasp-pin for securing it in place—such as collets, brooches, other forms of jewelry, campaign-buttons, &c.—and I do not, therefore, restrict the invention to any particular class of articles or devices.

In the construction illustrated, 10 indicates a back-plate, which may be of any particular shape and size, depending on the character of the article and the purpose of its use, and which in the present instance is shown as circular. The part 10 may be stamped to the desired shape or fashioned in any other suitable manner and, as shown, may be provided adjacent to its edge with a groove or recess 11 on the front or upper face thereof, such groove in the present instance extending entirely around the plate. The back 10 forms the support for the ornamental or exposed part of the device designed to be secured or held in place by the pin, and such part will depend on the character or use of the article and may be varied as desired. In the present embodiment of the invention I have shown the back 10 as provided with a face-plate 12, forming the outer or exposed side of the article with which the pin is employed and which, as a button is shown in the drawings, may be covered with a sheet of celluloid 13 or any other decorative facing.

The pin 14 is made from a single piece of wire, and its hinged end is provided with a suitable spring device designed to impart the necessary resiliency to the pin to keep it securely clasped, and it is so mounted as to be held against lateral movement and consequent loosening of the pin. To this end the end of the pin is provided with an angular or lateral wing or, as shown in the drawings, a pair of oppositely-disposed lateral wings 16 17. In one embodiment of the invention (that shown in Figs. 1 to 4, inclusive) the wire from which the pin is made is bent at substantially a right angle to the pin 14 and then bent back upon itself and carried past the pin, then bent inwardly again to about the point of the first bend and terminated in the tongue 15, which extends in the direction of the free end of the pin. The pin is mounted on the back 10 in a radial elongated opening or slot 18, cut across the groove 11. In mounting the pin the pointed end thereof is passed through the slot 18 from the front side of the back 10, and when in place the wings 16 17 lie in the groove 11 at opposite sides of the slot 18, as shown in Fig. 2, it being understood that the pin is placed in position before the front 12 is secured in place. When in position and the pin is clasped, the ends of the wings 16 17 bear against the inner face of the outer wall of the groove and the tongue 15 reacts against the wall at the inner end of the slot 18. The extended bearing of the hinge—that is to say, the engagement of the spring-wings 16 17 with the wall of the groove—prevents rocking or lateral movement of the pin. This is also true of any position the pin may be in, for when it is swung open into the position shown in Fig. 7 the wings bear against the under face of the plate 12 and, similarly, by reason of the wide bearing prevent lateral movement of the pin. In clasping the article in place the tongue 15 reacting against the inner end of the slot 18 serves to resist the closing of the pin, so that the spring-wings 16 17 are placed under tension. The pin is retained in its clasped position in any suitable manner. In the present instance the back 10 is provided with a slot 19 at a point diametrically opposite the slot 18 and into which the free end of the pin is entered to secure the same. The slot 19 is provided with a lateral extension 20, and an inwardly-extending tongue 21 projects into the slot. When the pin is clasped, its free end is pressed into the slot 19 and moved along the extension 20 and back of the tongue 21, the latter preventing the pin becoming disengaged until it is depressed so as to clear the tongue.

In Figs. 5, 6, and 7 is shown a modification of the spring-pin, which differs from the construction seen in Figs. 1 to 4, inclusive, only in the formation of the spring-wings of the pin. As there shown, the wire is bent laterally at a right angle to the pin portion, then bent back upon itself at a slight angle, forming the wing 22, and then continued to the opposite side of the pin, thence returning by a rebend to a point adjacent the first bend, forming the wing 23, the end of the wire terminating in a tongue 24, similar to the tongue 15. With this construction and by means of the wings 16 17 in the construction shown in Figs. 1 to 4 and 22 23 in Figs. 5 to 7 the pin is rendered very resilient, owing to the spring action of the wings, and owing to the wide bearing provided for the hinge of the pin the latter is held securely.

Various modifications may be made in the formation of the wings and in the manner of mounting the pin, and it is therefore to be understood that I do not limit myself to the details shown.

Having described my invention, what I claim as new, and desire to secure by Letters Patent, is—

1. A device of the class described comprising a back having an elongated opening, a pin passing through the opening and having a pair of lateral bearing-wings and a tongue projecting through the opening and adapted to react against the wall of the same, and means for securing the pin in its clasped position.

2. A device of the class described comprising a back having a groove and an elongated opening in the groove, a pin extending through the opening formed of a single piece of wire and provided with laterally and oppositely extending wings located in and engaging the wall of the groove, and a catch for holding the pin in its clasped position.

3. In a device of the class described, in combination, a back-plate provided with a groove and an elongated radial opening in the groove, a pin extending through the opening and provided with a pair of laterally and oppositely extending bearing-wings located in the groove and a tongue projecting through the opening and adapted to react against the wall of the same, the back also being provided with a slot to receive the free end of the pin, and a tongue projecting into the slot and engaged by the pin.

4. In a device of the class described, in combination, a back-plate having an annular groove and provided with a radial slot in the groove, a face-plate carried by the back, a pin projecting through the slot and provided with a pair of laterally and oppositely extending spring-wings located in the groove and engaging the wall of the groove when the pin is clasped and engaging the face-plate when the pin is unclasped, and a tongue on the pin projecting through and engaging the wall of the slot, the back also having a slot provided with a lateral extension to receive the free end of the pin and a tongue projecting into the slot to maintain the pin in its clasped position.

5. In a device of the class described, in combination, a back-plate having a recess provided with an elongated radial opening in the wall thereof, a face-plate secured to the back-plate, a pin extending through the said opening and provided with a pair of laterally and oppositely extending wings located in the recess and engaging the wall of the latter when the pin is clasped and adapted to engage the face-plate when the pin is unclasped, a tongue on the pin projecting through the opening and adapted to react against the wall thereof, and means for securing the pin in its clasped position.

In testimony whereof I affix my signature in presence of two witnesses.

GEORGE B. KEPLINGER.

Witnesses:
ARTHUR B. SEIBOLD,
ELIZABETH MOLITOR.